United States Patent
Watanabe

(10) Patent No.: US 12,128,581 B2
(45) Date of Patent: Oct. 29, 2024

(54) CIRCULAR SAW GUIDE DEVICE

(71) Applicant: Jiro Watanabe, Tokyo (JP)

(72) Inventor: Jiro Watanabe, Tokyo (JP)

(*) Notice: Subject to any disclaimer, the term of this patent is extended or adjusted under 35 U.S.C. 154(b) by 0 days.

(21) Appl. No.: 18/564,924

(22) PCT Filed: Jun. 2, 2022

(86) PCT No.: PCT/JP2022/022481
§ 371 (c)(1),
(2) Date: Nov. 28, 2023

(87) PCT Pub. No.: WO2022/255449
PCT Pub. Date: Dec. 8, 2022

(65) Prior Publication Data
US 2024/0262000 A1    Aug. 8, 2024

(30) Foreign Application Priority Data

Jun. 3, 2021  (JP) .................................. 2021-093947
Mar. 30, 2022  (WO) ................... PCT/JP2022/015968

(51) Int. Cl.
*G01B 3/1056* (2020.01)
*B25H 7/00* (2006.01)
(Continued)

(52) U.S. Cl.
CPC ................ *B27B 9/04* (2013.01); *B25H 7/00* (2013.01); *G01B 3/1048* (2020.01); *G01B 3/1056* (2013.01); *G01B 3/1084* (2013.01)

(58) Field of Classification Search
CPC .. B23D 47/02; B27B 9/04; B25H 7/00; G01B 3/1048; G01B 3/1056; G01B 3/1084
See application file for complete search history.

(56) References Cited

U.S. PATENT DOCUMENTS

| 5,390,425 A * | 2/1995 | Gilberts ............ B23Q 17/2233 |
| | | 83/745 |
| 6,591,509 B2 * | 7/2003 | LeBlanc ............ B23Q 9/0078 |
| | | 30/375 |

(Continued)

FOREIGN PATENT DOCUMENTS

| JP | 1152791975 | 2/1977 |
| JP | 244531992 | 10/1993 |

(Continued)

OTHER PUBLICATIONS

International Search Report, Japan Patent Office, Jul. 12, 2022.

*Primary Examiner* — Yaritza Guadalupe-McCall
(74) *Attorney, Agent, or Firm* — Bay State IP, LLC

(57) ABSTRACT

An object of the present disclosure is to provide a circular saw guide device enabling reliable cutting in the presence of a guide function even when having no workbench for placing a workpiece thereon. The circular saw guide device 2A includes a base member 6 having a guide end 4 on one end side in the longitudinal direction for guiding a saw blade 34 there along, a tape measure 10 provided with a scale 8 freely movable back and forth having a locking claw 8a to be hooked to an end face 30c of a square timber 30, and a handle 20. A central portion of the base member 6 in the longitudinal direction is a narrow grip section 16, and the tape measure 10 is stored in an end portion in the X2 direction of the handle 20.

9 Claims, 16 Drawing Sheets

(51) Int. Cl.
*B27B 9/04* (2006.01)
*G01B 3/1048* (2020.01)
*G01B 3/1084* (2020.01)

(56) References Cited

U.S. PATENT DOCUMENTS

| | | | | |
|---|---|---|---|---|
| 8,479,630 | B2* | 7/2013 | Osbourne | B26B 29/06 |
| | | | | 83/745 |
| 8,695,227 | B2* | 4/2014 | Sherman | G01B 3/1084 |
| | | | | 33/760 |
| 9,233,464 | B2* | 1/2016 | Sherman | B25H 1/0078 |
| 2003/0037453 | A1* | 2/2003 | Mastrobattista | B23Q 9/0042 |
| | | | | 33/484 |
| 2018/0328704 | A1* | 11/2018 | Kennedy | G01B 3/566 |

FOREIGN PATENT DOCUMENTS

| | | | | |
|---|---|---|---|---|
| JP | 7290401 | | 11/1995 | |
| JP | 2000351101 | | 12/2000 | |
| JP | 3142395 | | 6/2008 | |
| JP | 5909342 | B2* | 4/2016 | |
| WO | WO-2022254938 | A1* | 12/2022 | |
| WO | WO-2022255449 | A1* | 12/2022 | B23D 47/02 |

* cited by examiner

CIRCULAR SAW GUIDE DEVICE

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/JP2022/022481 filed on Jun. 2, 2022, and which in turn takes priority from International Application No. PCT/JP2022/015968 filed on Mar. 30, 2022, and Japanese Patent Application No. 2021093947 filed on Jun. 3, 2021, the disclosure of which is incorporated by reference herein in its entirety as part of the present application.

TECHNICAL FIELD

The present invention relates to a circular saw guide device used when cutting or notching a workpiece such as lumber using a circular saw.

BACKGROUND ART

When cutting a rafter to a predetermined length for example, a cutting line is drawn in a direction orthogonal to the longitudinal direction of the rafter using an L-shaped ruler after placing the rafter on a workbench, hooking the locking claw of a tape measure to a butt end, measuring a predetermined dimension position, and marking the position with a pencil or the like, and then the rafter is cut along the cutting line using an electric circular saw or a saw with a handle. When such cutting work is performed multiple times, the same operations as described above must be repeated, which is undeniably troublesome.

In order to solve this problem, Patent Document 1 proposes a saw guide with a built-in tape measure. This saw guide includes a guide fence along the side surface of a square timber and a guide plate arranged on the opposite side of the tape measure and orthogonal to the longitudinal direction of the square timber. The cutting work is completed simply by cutting the square timber along the surface of the guide plate using a saw after moving the body by predetermined dimensions with a locking claw of the tape measure hooked to the butt end. This necessitates neither operations of measuring and marking a predetermined dimension position and then drawing a cutting line, nor management of its handling because the tape measure is integrally provided.

Patent Document 2 proposes a guide device for an electrical power tool based on a similar principle. This guide device is configured to pull out a tape measure from the short part of an L-shaped guide plate and then guide a copying member (namely, a housing side edge) of an electric circular saw along the side edge of the long part, which is suitable for cutting a flat plate at a predetermined position from the butt end.

RELATED ART DOCUMENTS

Patent Documents

[Patent Document 1] U.S. Patent Application Publication No. 2008/0201965
[Patent Document 2] Utility Model Application Laid-Open Publication No. 4-13301

[Disclosure of the Invention] [Problems to be Solved by the Invention]

Incidentally, depending on the work site, there are situations where no workbench on which to place a workpiece is available and thus a rafter must be cut to predetermined dimensions on the spot. In such a case, in the saw guide disclosed in Patent Document 1, the cutting operation is performed using the saw after placing the rafter on the floor surface, placing the saw guide on the rafter and moving the body to a predetermined dimension position. This causes the saw blade to reach the floor, necessitating cutting the rafter with the rafter kept afloat from the floor surface. However, the saw guide having only a block-shaped outer shell makes it difficult to hold the saw guide at the predetermined position together with the rafter with one hand stably. It is also conceivable to remove the saw guide after making a notch to some extent while placing the rafter on the floor and then remove the saw guide to cut the rafter holding only the rafter in the hand. However, this enforces duplicate efforts, failing to utilize the original advantage of the saw guide. Also, the final-stage cutting while holding the rafter is performed without the guide plate, which may cause the cutting position to be out of position. The same applies to the guide device disclosed in Patent Document 2.

The present invention has been made in view of the above-mentioned problems, and its object is to provide a circular saw guide device enabling reliable performance of cutting in the presence of a guide function even without any workbench on which to place the workpiece.

Means of Solving the Problems

In order to achieve the above object, a circular saw guide device (2A) of the present invention includes a base member (6) having a guide end (4) on one end side in the longitudinal direction for guiding a saw blade (34) therealong. The base member (6) is to be abutted to a surface of a workpiece (30). The circular saw guide device (2A) also includes a tape measure (10) arranged on the other end side in the longitudinal direction of the base member (6) and provided with a scale (8) freely movable back and forth having a locking claw (8a) to be hooked to an end face (30c) of the workpiece (30). The circular saw guide device (2A) allows the guide end (4) to be set at a desired machining position based on scale marks (8b) of the scale (8) by moving the base member (6) with the locking claw (8a) hooked to the end face (30c) of the workpiece (30). The scale marks (8b) of the scale (8) start from a value equal to length dimensions (L1) from the guide end (4) to a measurement point (24c) at which the scale marks (8b) are to be read.

According to the circular saw guide device according to the present invention, the scale marks start from the value equal to the length dimensions from the guide end to the measurement point at which the scale makes are to be read, whereby the value of the scale mark of the scale at the measurement point is equal to the value of the length dimensions of the workpiece to be cut at a cutting position. This enables quick and accurate setting of the length dimensions (namely, cutting dimensions) of the workpiece to be cut by simply reading the scale mark at the measurement point.

Moreover, in the circular saw guide device (2A) described above, a grip section (16) smaller in width in a direction orthogonal to the longitudinal direction than both sides in the longitudinal direction may be arranged between one end sides (12a, 14a) and the other end sides (12b, 14b) of the base member (6). And a guide member (24) may be arranged on the grip section (16) side in the direction orthogonal to the longitudinal direction of the base member (6), extending in the longitudinal direction along a side surface (30b) perpendicular to a surface (30a) of the workpiece (30). This enables the workpiece to be gripped together with the grip section of the base member as far as the workpiece is smaller in width than the base member. In addition, this enables processing such as cutting while holding the workpiece by hand even when no workbench is available for placing the workpiece thereon, thereby improving the degree of freedom in processing work at the site. Furthermore, moving the circular saw guide device while abutting the guide member to the side surface of the workpiece can stabilize the movement and improve the accuracy of orthogonality of the guide end to the workpiece.

Moreover, in the circular saw guide device (2A) described above, a stepped edge (28) may be arranged parallel to the guide end (4) and inward from the guide end (4) in the longitudinal direction of the base member (6) for guiding a housing (36) of a circular saw (32) therealong. And a portion between the guide end (4) and the stepped edge (28) may be a support surface (26) for placing the housing (36) thereon. This enables stable and accurate machining with the saw blade guided along the guide end by placing the circular saw on the support surface with the housing guided along the stepped edge.

Moreover, in the circular saw guide device (2A) as described above, the support surface (26) may have a width exceeding the width in the longitudinal direction of the housing (36) so as to have dimensions according to the type of circular saw to be used by cutting off extra dimensions before use using the saw blade (34). According to this, circular saws of different types can obtain a suitable supporting surface with no need of purchasing a new circular saw guide device according to the type of circular saw to be used.

Furthermore, in the circular saw guide device (2B), a guide member (46) may be arranged also on the side opposite to the grip section (42) in the direction orthogonal to the longitudinal direction of the base member (40) with the guide members (44, 46) arranged retractable so that one of them causes no interference when using the other. This enables one of the guide members to be retracted in case the one of them disturbs the other while taking advantage of the configuration in which both guide members can be used selectively as appropriate.

Furthermore, in the circular saw guide device (2A) as described above, a handle member (20) may be arranged over an upper surface of the grip section (16) of the base member (6), forming a through section (18) for passing the fingers therethrough. This enables easy movement of the circular saw guide device for improving usability and stable gripping due to the fingers restrained in the through section when gripping the workpiece together with the base member.

Moreover, in the circular saw guide device (2A), a tape measure storage section (22) may be arranged on the other end side of the handle member (20) for detachably storing the tape measure (10). This enables easy replacement of a fragile tape measure due to loss of linearity of the scale.

Furthermore, in the circular saw guide device (2A) as described above, dimensions between an end on one end side of the handle member (20) and the stepped edge (28) of the base member (6) may be set so that a motor (38) of the circular saw (32) causes no interference with the handle member (20). This enables easy and accurate processing such as cutting due to smooth movement of the circular saw.

Moreover, in the circular saw guide device (2A), a memo writing section (20a) may be arranged on the handle member (20). This enables writing down memos such as dimensions to be memorized during work and avoidance of the trouble of conventional ways of writing on the palm or the back of the hand and hand-wash for erasing it.

Moreover, in the circular saw guide device (2A), the memo writing section (20a) may be a whiteboard. This facilitates easy erasing of the memos.

Effects of the Invention

The present invention enables the length dimensions (namely, the cutting dimensions) of the workpiece to be quickly and accurately set simply by reading the scale marks at the measurement point and thus the workpiece to be cut to that length simply. In addition, as far as the workpiece is smaller in width than the base member, the workpiece can be reliably cut or notched in the presence of a guide function even with no workbench on which to place the workpiece.

BRIEF DESCRIPTION OF THE DRAWINGS

FIG. 10 is a view corresponding to FIG. 5 illustrating a usage example of the circular saw guide device shown in FIG. 8, of which

MODE FOR CARRYING OUT THE INVENTION

Hereinafter, embodiments of the present invention will be described in detail with reference to the accompanying drawings.

Figure 1:
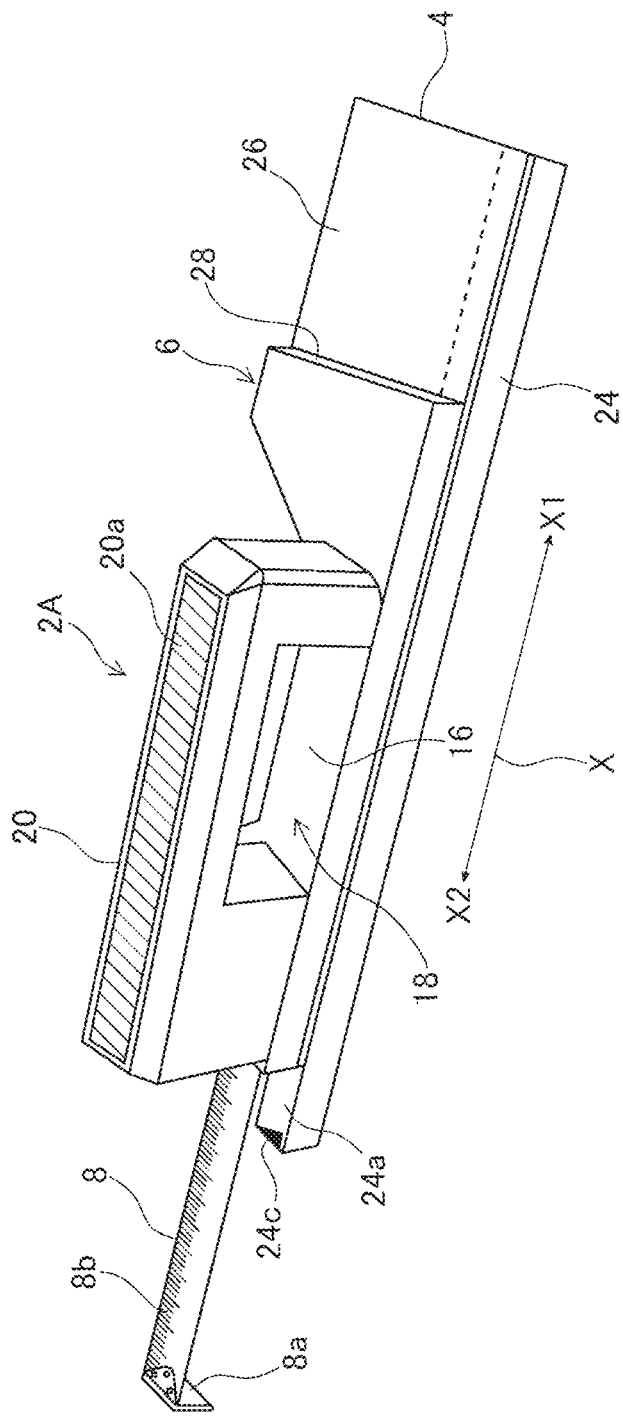
FIG. 1 is a perspective view of a circular saw guide device according to a first embodiment.
Figure 2:
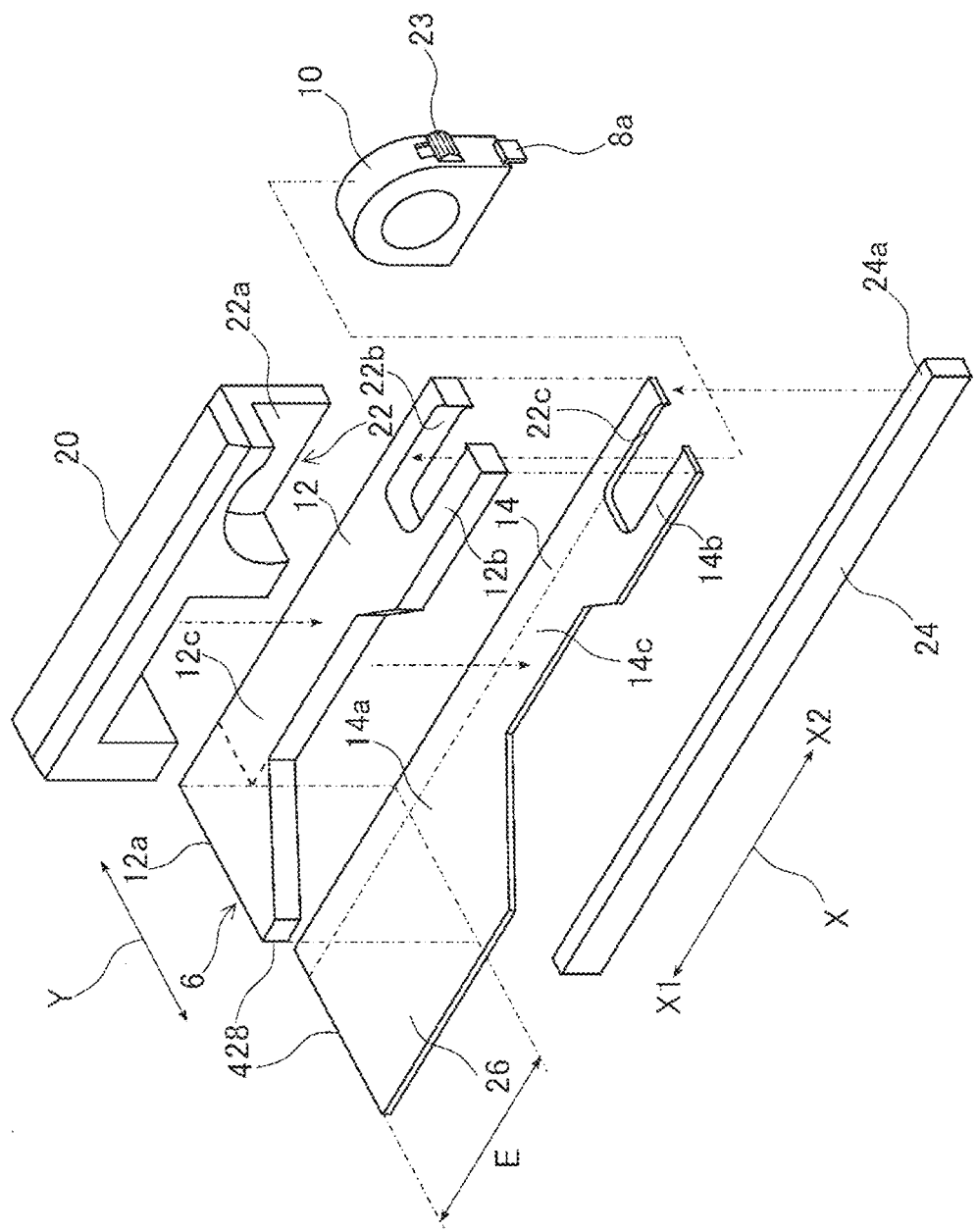
FIG. 2 is an exploded perspective view viewed from the opposite side of the circular saw guide device shown in FIG. 1.

[First embodiment] A first embodiment will be described with reference to FIGS. 1 to 7. FIG. 1 is a front perspective view of a circular saw guide device 2A according to the present embodiment for right-handed use, and FIG. 2 is an exploded perspective view viewed from the back side. As shown in FIGS. 1 and 2, the circular saw guide device 2A includes a base member 6 having a guide end 4 on one end side (namely, X1 side) in the longitudinal direction (namely, in the arrow X direction) for guiding a saw blade 34 (see FIG. 7) of a circular saw 32 therealong. The base member (6) is to be abutted to a surface of a workpiece 30. The circular saw guide device 2A also includes a tape measure 10 arranged on the other end side (X2 side) in the longitudinal direction of the base member 6 and provided with a steel scale 8 freely movable back and forth having a locking claw (locking section) 8a to be hooked to an end face 30c of a square timber 30 as a workpiece (see FIGS. 5 and 6). The circular saw guide device 2A allows the guide end 4 to be set at a desired machining position based on scale marks 8b of the scale 8 by moving the base member 6 in the X1 direction with the locking claw 8a hooked to the end face 30c of the workpiece 30. That is to say, dimensions obtained by adding substantial length dimensions of the base member 6 in the longitudinal direction to dimensions of the pulled-out scale 8 are dimensions of the desired machining position. In other words, when moving the base member 6 in the X1 direction so that the scale 8 is pulled out by dimensions obtained by subtracting the substantial length of the base member 6 from desired processing dimensions of the square timber 30, the position of the guide end 4 at that time corresponds to the desired machining position. The substantial length of the base member 6 refers to a length minus overlapped dimensions of the scale 8.

In the present embodiment, the scale marks 8b are displayed on the scale 8 so that a value at the position (tip) of the locking claw 8a is equal to a length L1 from the guide end 4 to the measurement point 24c that is the substantial length of the base member 6 in the longitudinal direction. In other words, the scale marks 8b of the scale 8 start from the value equal to the length L1 from the guide end 4 to the measurement point 24c. Accordingly, the scale mark 8b of the pulled-out scale 8 read at the measurement point 24c indicates the value of the processing dimensions of the square timber 30 (equivalent to a length from the end face 30c of the square timber 30 to which the locking claw 8a is hooked to a cut surface).

As shown in FIG. 2, the base member 6 has a configuration of a flat plate-like base body 12 and a bottom plate 14 thinner than the base body 12 that are stacked and bound together. A grip section 12c small in width in a direction (Y direction) orthogonal to the longitudinal direction (X direction) (or, smaller in width than both sides in the longitudinal direction) is formed between one end 12a and the other end 12b of the base body 12. Similarly, a grip section 14c small in width in the direction (Y direction) orthogonal to the longitudinal direction (X direction) (or, smaller in width than both sides in the longitudinal direction) is formed between one end side 14a and the other end side 14b of the bottom plate 14. A grip section 16 (see FIG. 1) small in width is configured by stacking the grip section 12c and the grip section 14c.

A handle 20 is fixed over an upper surface of the grip section 16 of the base member 6. The handle 20 serves as a handle member forming a through section 18 for passing fingers therethrough between the handle 20 and the base body 12. The handle 20 is in the shape of a U-shaped block with corners chamfered for easy gripping. In addition, a whiteboard 20a as a writing section for writing down a memo as indicated by hatching (omitted in figures other than FIG. 1) is embedded in the upper surface of the handle 20 for writing or erasing dimensions to be noted during processing. The through section 18 in this embodiment has an opening degree at which four fingers other than the thumb can pass therethrough.

Figure 3:
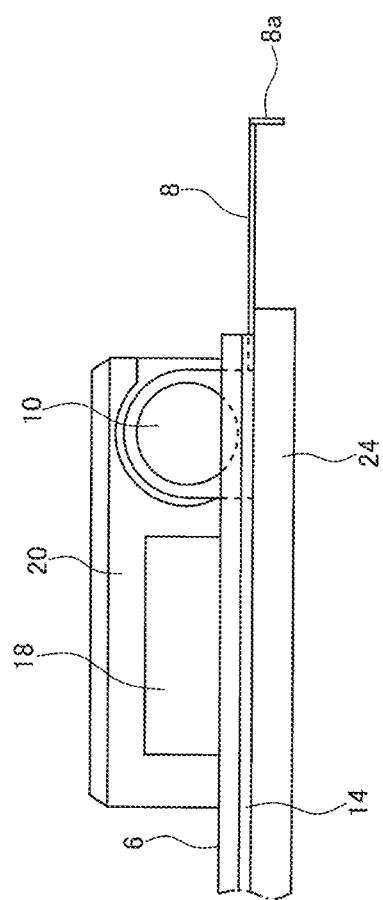
FIG. 3 is a rear view of a main part of a tape measure side of the circular saw guide device shown in FIG. 1.

On the other end side (X2 side) of the handle 20, a main section 22a of a tape measure storage section 22 is formed for detachably (or exchangeably) storing the tape measure 10. Concave sections 22b, 22c communicating to the main section 22a are formed on the base body 12 and the bottom plate 14. Opening ends of the concave sections 22b, 22c on the X2 direction side are narrowed so that a locking mechanism (not shown in the figure) can prevent the tape measure 10 from coming off both downward and in the X2 direction after the tape measure 10 is stored from the bottom side of the base member 6. The tape measure 10 has a locking knob 23 for locking the scale 8 at a position up to which to pull out the scale 8. As shown in FIG. 3, the scale 8 is pulled out along the bottom surface of the bottom plate 14 so that almost no gap lies between the scale 8 and the surface of the square timber 30.

As shown in FIGS. 1 and 2, a guide fence (namely, a guide member) 24 extending in the longitudinal direction along the side surface perpendicular to the surface of the square timber 30 is fixed to the lower surface of the bottom plate 14 on the grip section 16 side in the direction orthogonal to the longitudinal direction of the base member 6. The guide fence 24 has such a length as to protrude slightly from the base member 6 in the X2 direction. A protruding portion 24a thereof functions as a guide for the scale 8.

As shown in FIG. 2, one end side of the bottom plate 14 extends longer than the base body 12 in the X1 direction by dimensions E. This portion serves as a support surface 26 on which to place a housing (namely, a case) of the electric circular saw (that will be described later). An end of the support surface 26 in the X1 direction serves as the guide end 4. An end edge of the base body 12 in the X1 direction forms a stepped edge 28 rising upward from the support surface 26 and parallel to the guide end 4. In other words, the stepped edge 28 is arranged in parallel to the guide end 4 and inward from the guide end 4 in the longitudinal direction of the base member 6 for guiding the housing of the electric circular saw therealong. The portion between the guide end 4 and the stepped edge 28 serves as the support surface 26 for placing the housing of the electric circular saw thereon.

Figure 4:
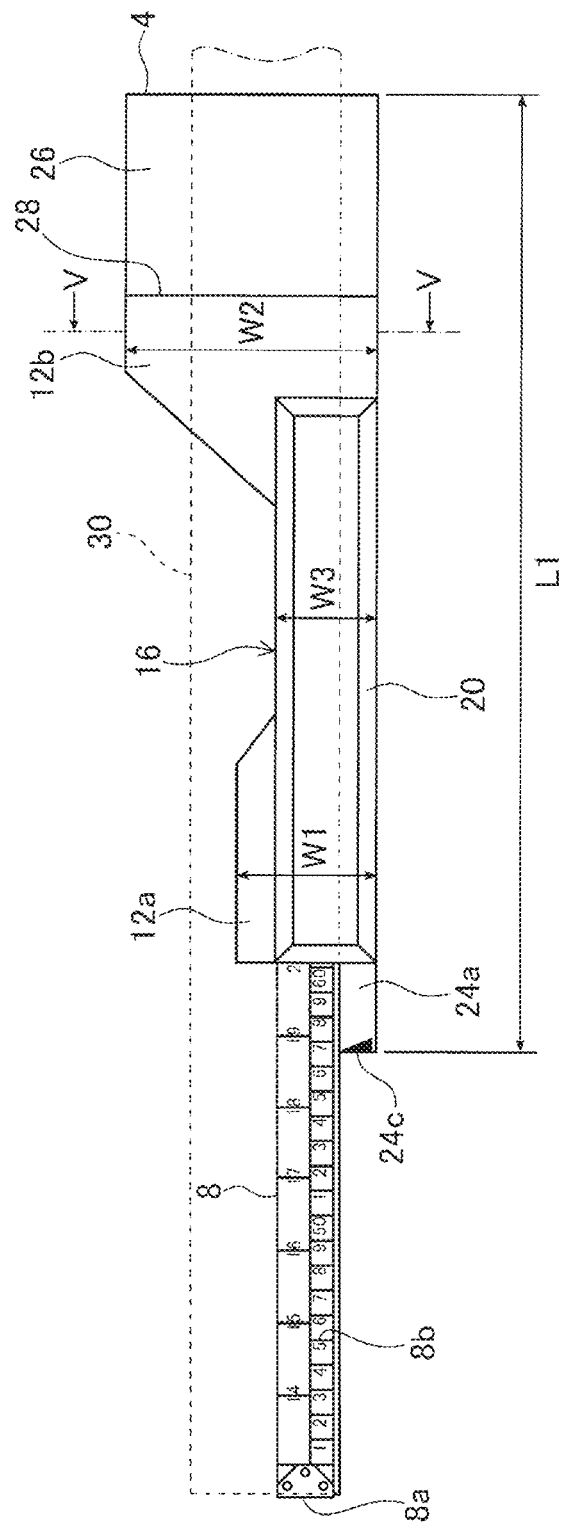
FIG. 4 is a plan view of the circular saw guide device shown in FIG. 1.
Figure 5:
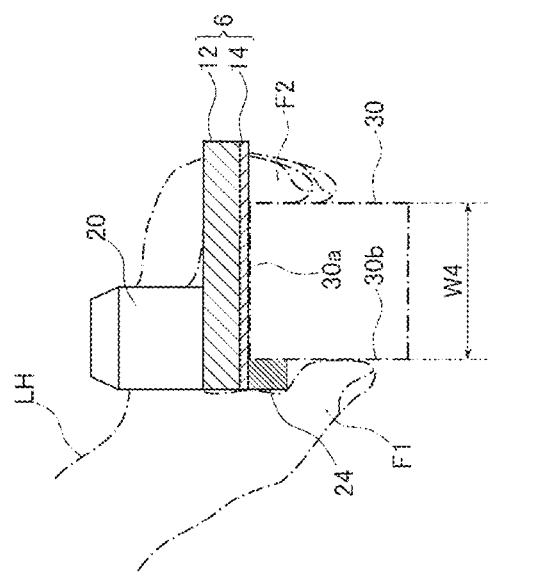
FIG. 5 is a cross-sectional view taken along line V-V of FIG. 4.
Figure 6:
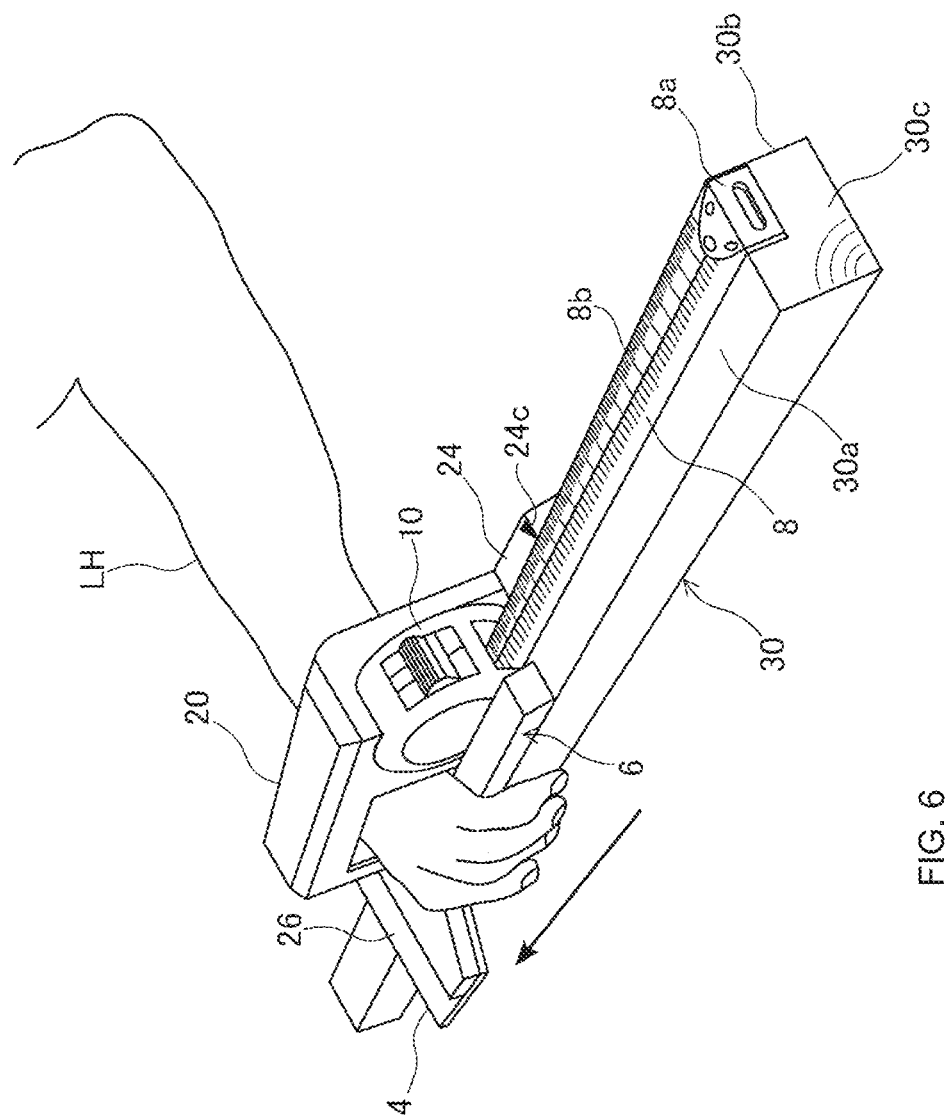
FIG. 6 is a perspective view illustrating a state before cutting a square timber in the use of the circular saw guide device shown in FIG. 1.

As shown in FIG. 4, the width W1 of the one end 12a in the Y direction of the base body 12 is smaller than the width W2 of the other end 12b because of irrelevance to the formation of the guide end 4 unlike the other end 12b. The width W3 of the grip section 16 is smaller than the width W1 of the one end 12a. As shown in FIG. 5, such narrower grip section 16 enables gripping of the square timber 30 together with the base member 6 between the thumb F1 of the left hand LH and the index and other fingers F2 other than the thumb F1 through the through section 18 as far as the width W4 of the square timber (rafter) 30 is smaller than the maximum width (W2) of the base member 6. In other words, as shown in FIG. 6, when moving the circular saw guide device 2A along the longitudinal direction of the square timber 30 while abutting the guide fence 24 in parallel against a side surface 30b perpendicular to a surface 30a of the square timber 30 and hooking the locking claw 8a of the scale 8 to the end face 30c of the square timber 30 (namely, a butt end face), the guide end 4 comes to the desired processing position (or the cutting position here). At this point, the square timber 30 is set so that the value of the scale mark 8b of the scale 8 at the measurement point 24c is desired cutting dimensions as the value of the scale mark 8b of the scale 8 at the measurement point 24c is the length dimensions of the square timber 30 after cutting. In this manner, as the value of the scale mark 8b of the scale 8 at the measurement point 24c is the length dimensions of the square timber 30 to be cut at the cutting position, the circular saw guide device 2A of the present embodiment enables immediate setting of the length dimensions of the square timber 30 to be cut simply by reading the value of the scale mark 8b of the scale 8 at the measurement point 24c. After that, when gripping the square timber 30 together with the base member 6 via the grip section 16 with the left hand, the square timber 30 and the circular saw guide device 2A are integrated, which enables the cutting position to be automatically set using the guide end 4 with no positional displacement.

Figure 7:
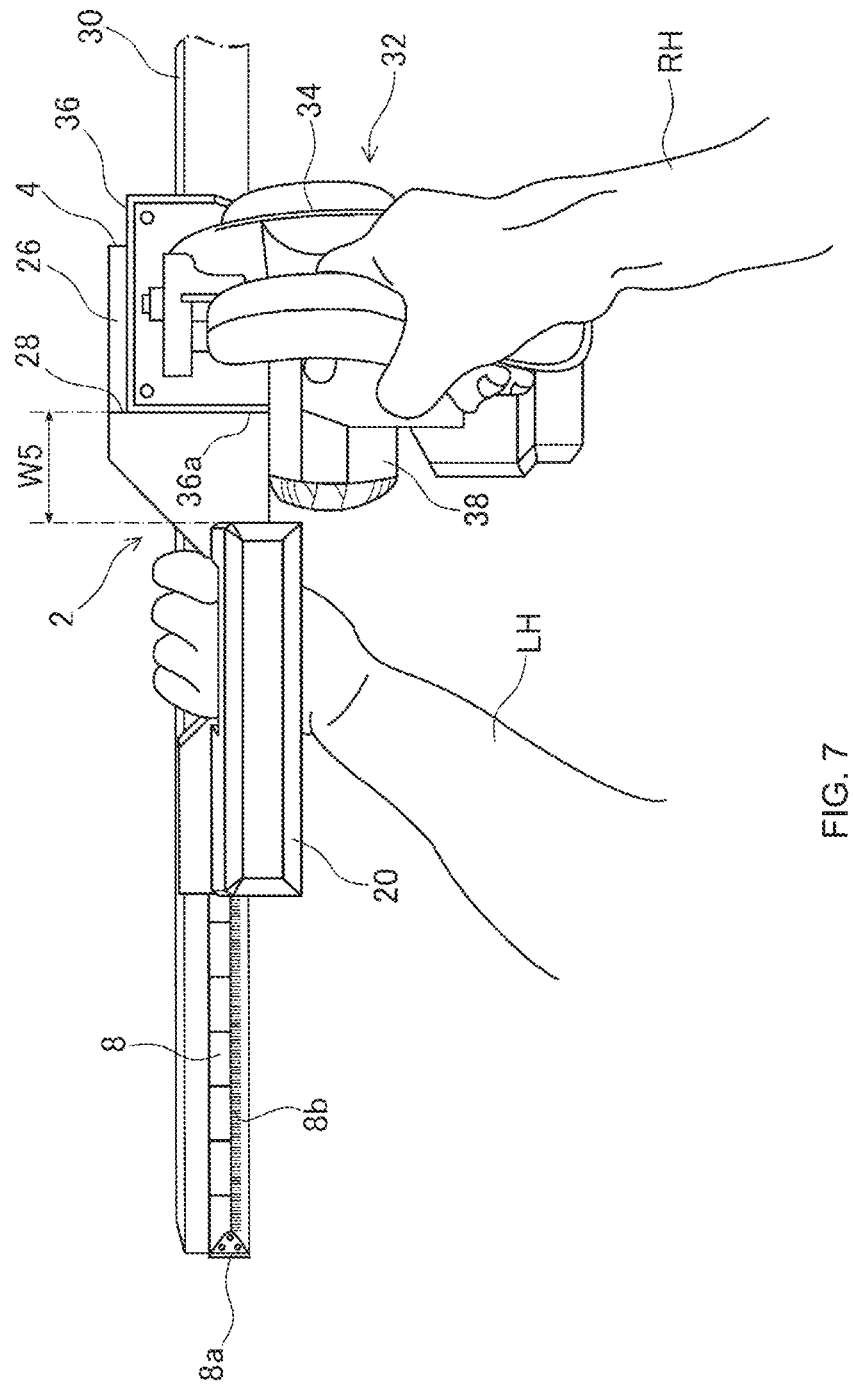
FIG. 7 is a top perspective view illustrating a state in which an electric circular saw is used to cut the square timber from the state shown in FIG. 6.

In this state, as shown in FIG. 7, when moving the electric circular saw 32 held by the right hand RH in the Y direction so that the saw blade 34 is guided along the guide end 4, the square timber 30 can be cut precisely at the desired position (namely, to desired length dimensions). This eliminates the need of a workbench for placing the square timber 30 thereon, enabling easy cutting with the square timber 30 held in hand in the air in an optional posture. The support surface 26 is set to a length E so that the saw blade 34 is guided along the guide edge 4 when abutting a side end 36a of the housing 36 of the electric circular saw 32 against the stepped edge 28. Dimensions W5 between an end on one end side of the handle 20 and the stepped edge 28 of the base member 6 are set so as to avoid the interference of the motor 38 of the electric circular saw 32 with the handle 20. The guide fence 24 stabilizes the movement of the circular saw guide device 2A and contributes to improving the accuracy of orthogonality of the guide end 4 with respect to the square timber 30.

When a left-handed person uses the above-described configuration designed basically for a right-handed person, the left-handed person performs an operation to move the saw blade 34 of the electric circular saw 32 held in the left hand along the guide end 4 while grasping the square timber 30 together with the base member 6 with his/her fingers of the right hand passed through the through section 18 from the opposite side of the handle 20. As a matter of course, the base member 6 and the handle 20 may be reversed in shape to achieve a configuration for the left-handed use. Regardless of the dispensability of the handle 20, the handle 20 can improve the convenience of handling the circular saw guide device 2A and stabilize the integration with the square timber 30 by positioning (restraining) the fingers inserted into the through section 18. Although the present embodiment illustrates an example of gripping the square timber 30 together with the base member 6, the present embodiment is applicable as is the case of a conventional product such as the one disclosed in Patent Document 2 even when cutting a flat plate of such a size as incapable of being gripped together with the base member 6. In such case, the handle 20 improves the moving operability of the circular saw guide device 2A as compared with the conventional product.

Figure 8:
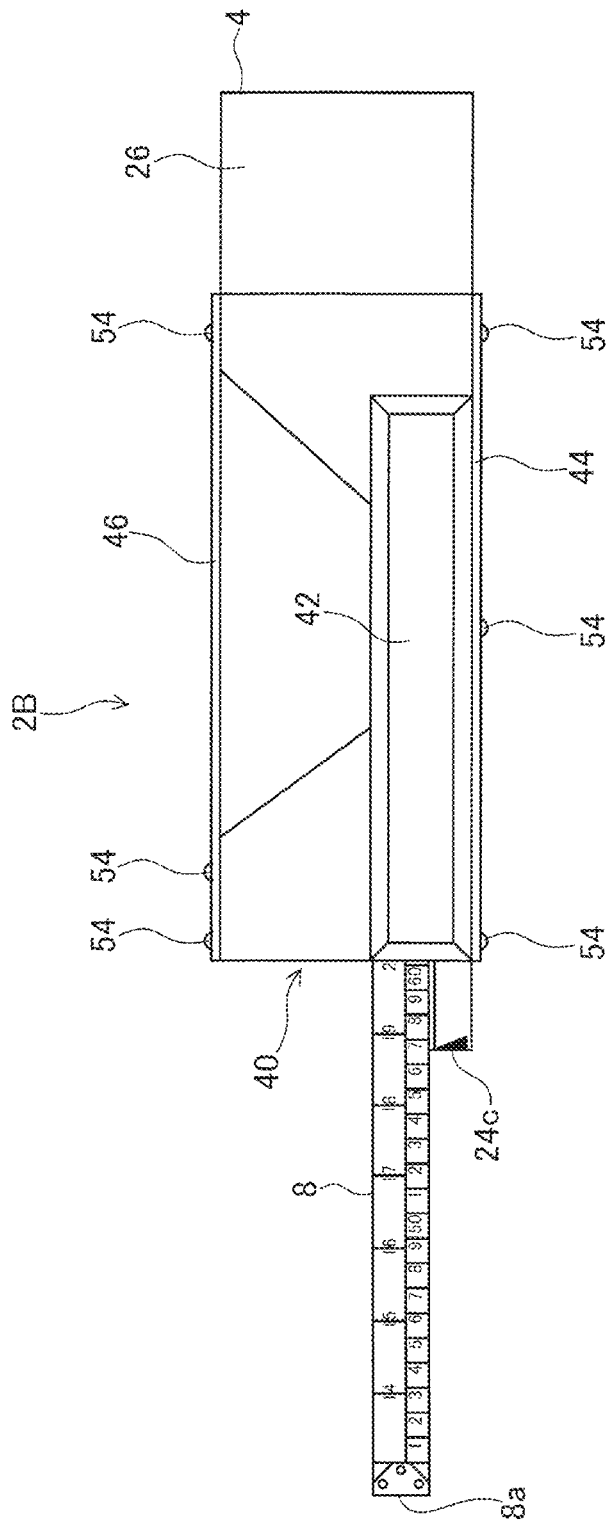
FIG. 8 is a plan view of a circular saw guide device according to a second embodiment.

[Second embodiment] A second embodiment will be described with reference to FIGS. 8 to 10. The same parts as those of the above-described embodiment are indicated by the same reference numerals, and the explanation of the structure and function already given will be omitted as appropriate. As shown in FIG. 8, in a circular saw guide device 2B according to the present embodiment, a guide fence (namely, a guide member) 44 is arranged on the side of a grip section 42 in a direction orthogonal to the longitudinal direction of a base member 40. In addition, a guide fence (namely, a guide member) 46 is arranged also on the side opposite to the grip section 42. As will be described below, these guide fences 44, 46 are arranged retractable so that one of them causes no interference with the other when using the other.

Figure 9:
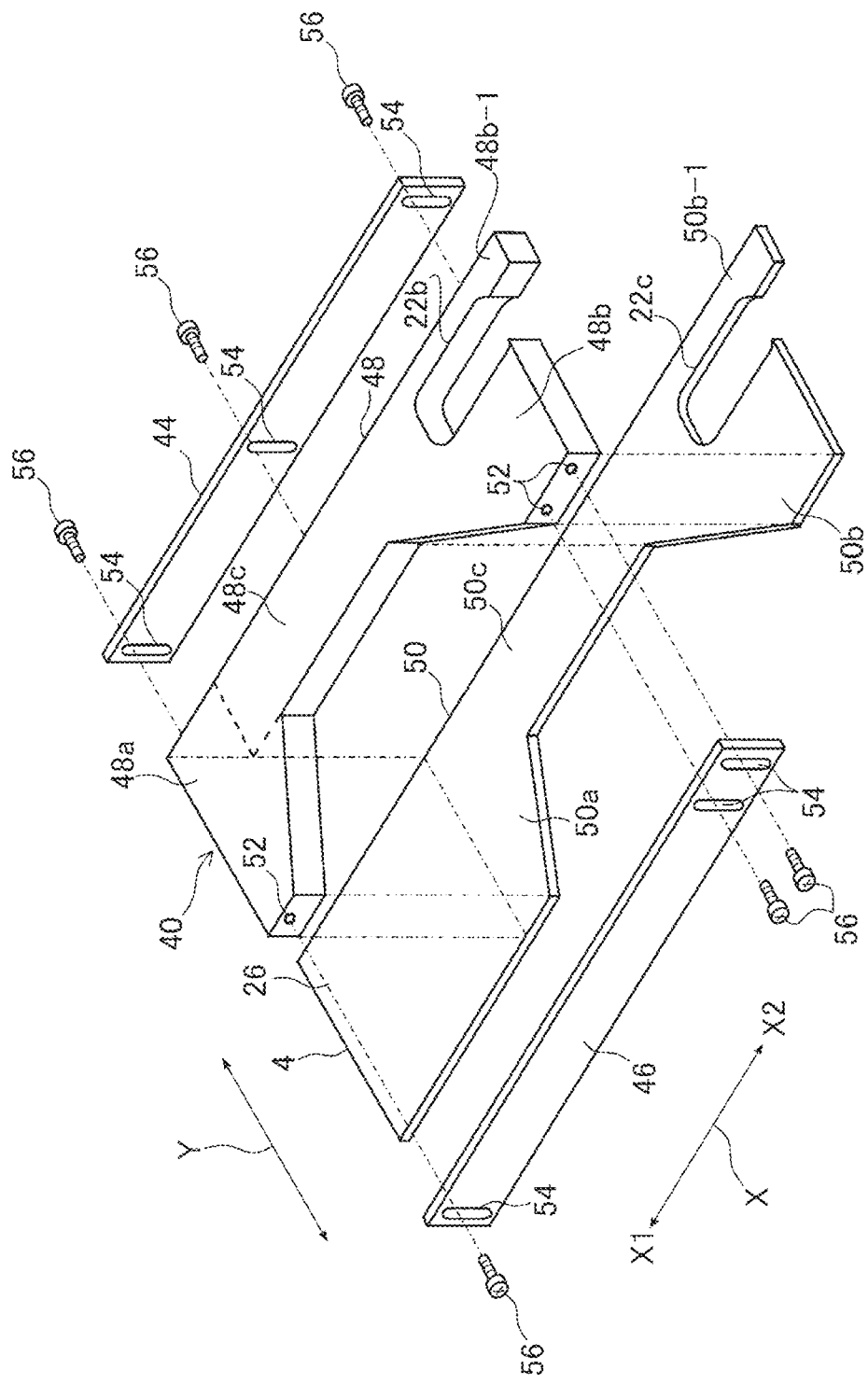
FIG. 9 is an exploded perspective view of a main part of the circular saw guide device shown in FIG. 8.

As shown in FIG. 9, the base member 40 has a configuration of a flat plate-like base body 48 and a bottom plate 50 thinner than the base body 48 that are stacked and bound together. Reference numerals 48a, 50a indicate one end sides, 48b, 50b indicate the other end sides, and 48c, 50c indicate the grip section. The grip section 42 (see FIG. 8) is configured by stacking the grip sections 48c, 50c together. Portions 48b-1, 50b-1 of the other end sides 48b, 50b protrude in the X2 direction, and the stacked portion thereof has the same function as the protruding portion 24a of the guide fence 24 in the first embodiment. The other end sides 48b, 50b extend so as to be the same as the one end sides 48a, 50a in width in the Y direction. On the side opposite to the grip section 42 side of the thicker base body 48, one and two nut members 52 are embedded respectively in the one end side 48a and the other end side 48b. Although not shown in the figure, the nut members 52 are embedded at three locations, namely, in both ends and the center in the X direction on the grip section 42 side of the base body 48. Each of the guide fences 44, 46 has an elongated hole 54 extending vertically at a position corresponding to the nut member 52 so as to be fixed to the base member 40 with a screw member 56 screwed into the nut member 52. In other words, each of the guide fences 44, 46 is slidable in the vertical direction (namely, retractable upward). Each of the guide fences 44, 46 stabilizes the movement of the circular saw guide device 2B and contributes to improving the accuracy of orthogonality of the guide end 4 with respect to the square timber 30.

Figure 10A:
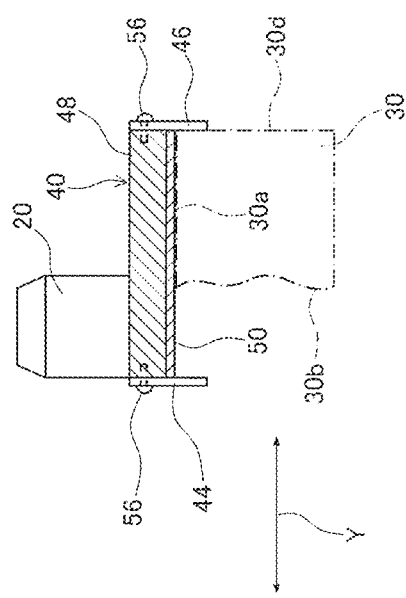
FIG. 10A is a view illustrating a usage example of one of two guide fences while both are set at use positions.
Figure 10B:
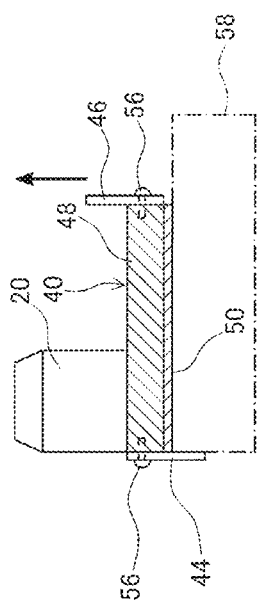
FIG. 10B is a view illustrating a usage example of one of the guide fences while the other is retracted from a flat plate larger in width than the base member.

FIG. 10A shows an example of using the guide fence 46 on the side opposite to the grip section 42 side while fixing both guide fences 44, 46 at use positions. For instance, when the side surface 30b perpendicular to the surface 30a of the square timber 30 has unevenness, the guide fence 46 is abutted to an opposite side surface 30d having high plane accuracy to move the base member 40. In this manner, selective use of one of the guide fences 44, 46 depending on the situation can improve usability. As shown in FIG. 10B, when a flat plate 58 is larger in width in the Y direction than the base member 40, the other guide fence 46 is retracted upward to be fixed so as to cause no interfere with the use of the oner guide fence 44.

Figure 11:
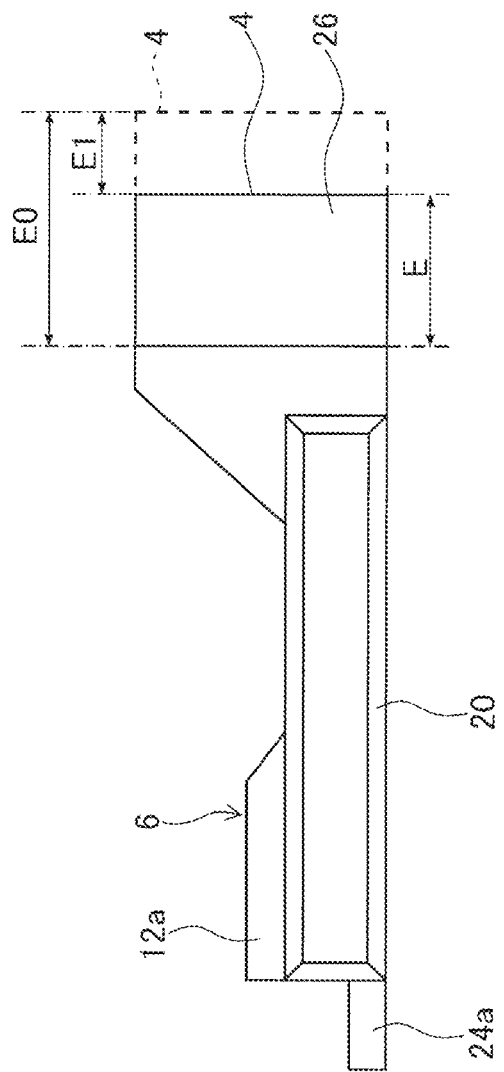
FIG. 11 is a plan view of a circular saw guide device according to a third embodiment.

[Third Embodiment] A third embodiment will be described with reference to FIG. 11. The support surface 26 differs in length E in the X1 direction shown in FIG. 2 according to differences in width of the housing 36 (see FIG. 7) in the X1 direction depending on the type of the electric circular saw 32. In the present embodiment, the length of the support surface 26 in the X1 direction is set to the maximum width E0 for all types of the electric circular saw 32 in the distribution stage so as to be compatible with all types of the electric circular saw 32. In other words, the support surface 26 before use has the width (namely, the length E0) exceeding the width (namely, the length E) of the housing 36 in the longitudinal direction (X direction). In this case, if the electric circular saw 32 to be used is incompatible with the maximum width E0, the side end 36a of the housing 36 is abutted to the stepped edge 28 before use to move the electric circular saw in the Y direction and then cut off excess dimensions E1 using the saw blade 34. This enables the support surface 26 to have the guide end 4 compatible with the saw blade 34 of the electric circular saw 32 to be used. This can be implemented similarly in other embodiments.

Figure 12:
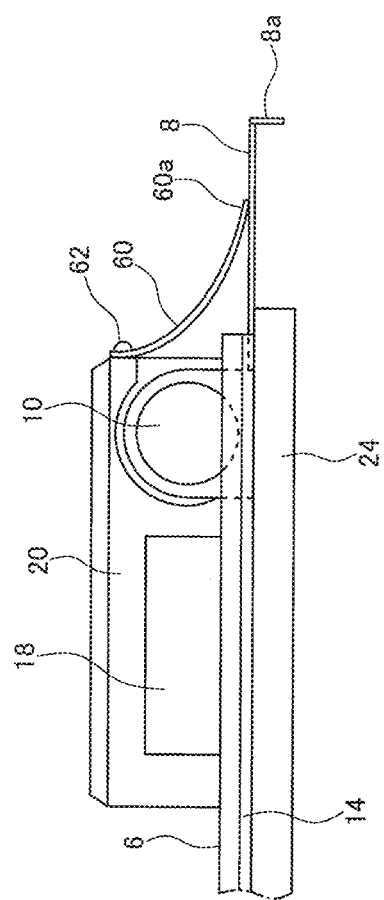
FIG. 12 is a rear view of a main part of a tape measure side of a circular saw guide device according to a fourth embodiment.

[Fourth embodiment] A fourth embodiment will be described with reference to FIG. 12. When removing the locking claw 8a from the square timber 30, the scale 8 is automatically rewound by steel elasticity. In this embodiment, for saving the effort of operating the lock knob 23 each time, a strip-like elastic body 60 is fixed to an upper end of the handle 20 with a screw 62 so that a free end 60a thereof abuts to an upper surface of the scale 8 for stopping the scale 8 returning by the frictional force. This can prevent the scale 8 from returning unexpectedly and avoid the trouble an operator must suffer of moving to the end face 30c side (namely, the zero dimension position) of the square timber 30 each time the scale 8 is automatically rewound, thereby improving workability. This can be implemented similarly in other embodiments.

Figure 13:
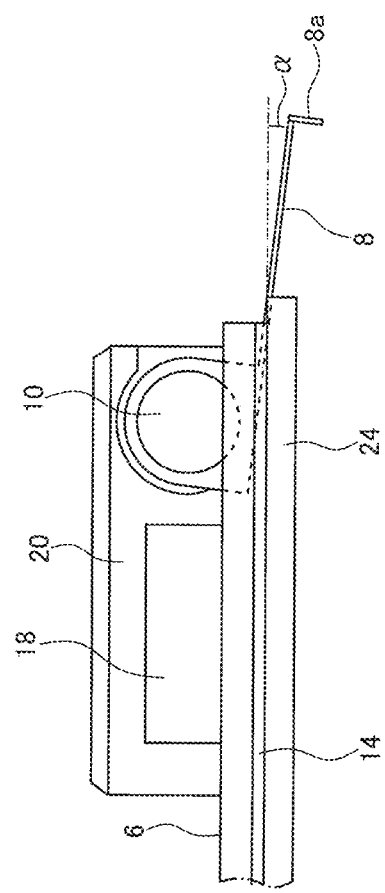
FIG. 13 is a rear view of a main part of a tape measure side of a circular saw guide device according to a fifth embodiment.

[Fifth embodiment] A fifth embodiment will be described with reference to FIG. 13. In this embodiment, the tape measure 10 is stored in the tape measure storage section 22 so as to be slightly inclined. Specifically, the tape measure 10 is installed at the center in the tape measure storage section 22 so as to be kept rotated clockwise by an angle α as shown in FIG. 13 and fixed with a fixture not shown in the figure so as to keep that state. Consequently, as shown in the figure, the scale 8 pulled out from the tape measure 10 is inclined by an angle α with respect to the lower surface of the base member 6 so that the scale 8 is slightly inclined extending gradually downward from the root toward the tip of the tape measure 10. This configuration has the effect of the extreme ease of hooking (locking) the locking claw 8a of the scale 8 to the end face (butt end face) 30c of the square timber 30. Furthermore, this has another effect of less likelihood for the locking claw 8a to come off from the end face 30c of the square timber 30 when moving the base member 6 to pull out the scale 8 from the tape measure 10 with the locking claw 8a hooked to the end face 30c of the square timber 30. It should be noted that the angle α can be set to approximately 5 to 10 degrees as an example. FIG. 13 exaggerates the inclination of the tape measure 10.

Figure 14:
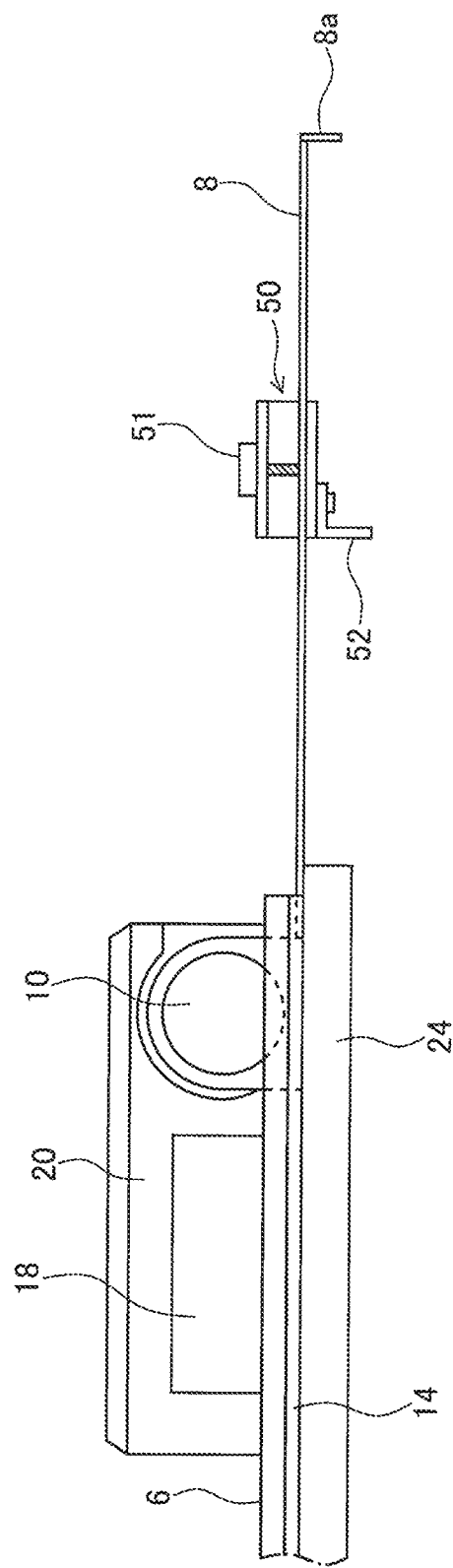
FIG. 14 is a rear view of a main part of a tape measure side of a circular saw guide device according to a sixth embodiment.

[Sixth embodiment] A sixth embodiment will be described with reference to FIG. 14. In the first embodiment, the scale marks 8b are displayed on the scale 8 so that the value at the position (tip) of the locking claw 8a is equal to the length L1 from the guide end 4 to the measurement point 24c that is the substantial length of the base member 6 in the longitudinal direction. In the present embodiment, a stopper member 50 is mounted on the scale 8 while the scale mark 8b displayed on the scale 8 at the position (tip) of the locking claw 8a indicates 0 as a normal value. The stopper member 50 includes a fixing member 51 such as a screw for fixing the scale 8 by sandwiching top and bottom surfaces thereof, and a locking tool 52 to be hooked (locked) to the end face (butt end face) 30c of the square timber 30. This stopper member 50 can be fixed at any position in the longitudinal direction of the scale 8. Therefore, if the stopper member 50 is fixed at a position where the scale mark 8b of the scale 8 at the position of the locking tool 52 is equal to the substantial length of the base member 6 in the longitudinal direction, also in the present embodiment, the scale mark 8b of the pulled-out scale 8 read at the measurement point 24c indicates the value of the processing dimensions of the square timber 30 (equivalent to the length from the end face 30c of the square timber 30 to which to hook the locking claw 8a to a cut surface).

Therefore, according to the present embodiment, a commercially available tape measure with the value of the scale mark 8b at the tip of the scale 8 being 0 can be used as the tape measure 10, thereby enabling reduction in the manufacturing cost of the circular saw guide device. In addition, if the tape measure 10 has a failure during use, only the tape measure 10 can be replaced with a commercially available one, thereby contributing to improving the durability of the circular saw guide device.

Figure 15:
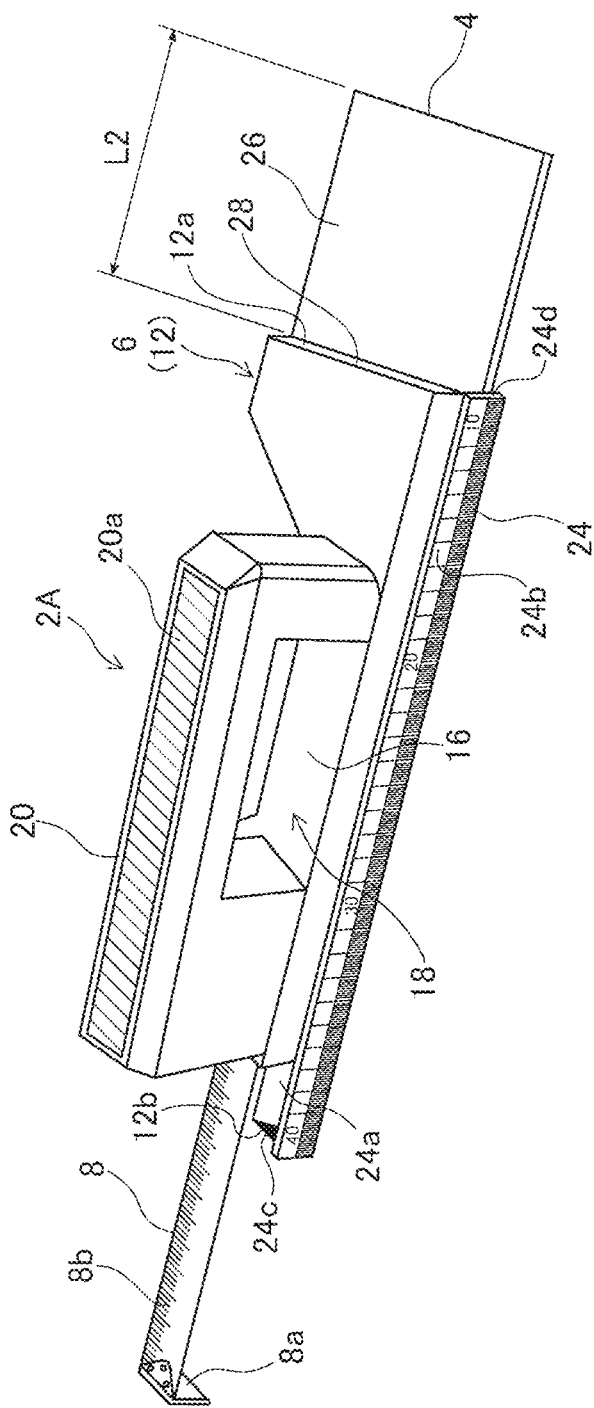
FIG. 15 is a perspective view of a circular saw guide device according to a seventh embodiment.
Figure 16:
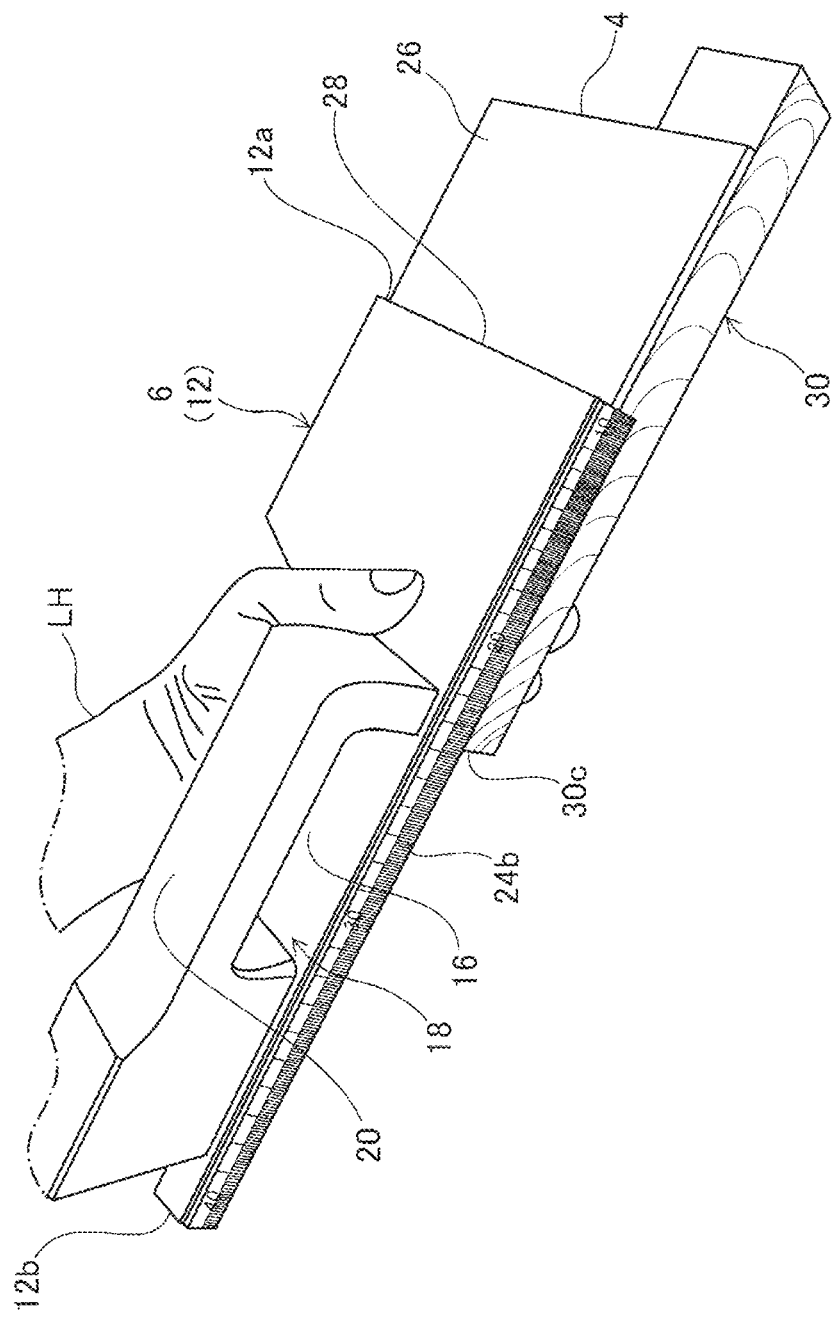
FIG. 16 is a view illustrating how to use the circular saw guide device according to the seventh embodiment.

[Seventh embodiment] A sixth embodiment will be described with reference to FIGS. 15 and 16. In this embodiment, auxiliary scale marks 24b are further displayed on a side surface (namely, an outer side surface) of the guide fence 24. The auxiliary scale marks 24b indicate a length so that values gradually increase from the one end 12a side (namely, the stepped edge 28 side) of the base member 6 (namely, the base body 12) toward the other end 12b side (namely, the tape measure 10 side). These auxiliary scale marks 24b start from a value at an end 24d corresponding to the one end 12a (namely, the stepped edge 28) of the base body 12 equal to length dimensions L2 of the support surface 26 between the guide end 4 and the stepped edge 28.

If the length of the square timber 30 to be cut (namely, the cutting length) is smaller than the length L1 from the guide end 4 to the measurement point 24c, the length of the square timber 30 to be cut is measured using the auxiliary scale marks 24b for setting. In other words, as shown in FIG. 16, while gripping the square timber 30 together with the base member 6 with the left hand LH, the square timber 30 is set so that the scale mark 24b at the position corresponding to the end face 30c of the square timber 30 indicates the length dimensions of the square timber 30 after cutting. After that, as in the other embodiments, when moving the electric circular saw 32 so that the saw blade 34 is guided along the guide end 4, the square timber 30 can be cut precisely at the desired position (or, to the desired length dimensions). According to this embodiment, even when the length of the square timber 30 to be cut (namely, the cutting length) is smaller than the length L1 from the guide end 4 to the measurement point 24c, the square timber 30 can be quickly and accurately cut to the desired length.

As materials for the circular saw guide device according to each of the above embodiments, wood-based materials and synthetic resin materials such as plastics can be used, and light metals such as aluminum alloys can also be partially used. Furthermore, a combination of two or more of these materials can also be used. Moreover, although an example of cutting board materials using the electric circular saw 32 has been shown in each of the above-described embodiments, an electric straight blade saw or a manual saw enables cutting in the same manner.

Although the embodiments of the present invention have been described above, the present invention is not limited to the above embodiments, and various modifications can be made within the scope of the technical ideas described in the claims, specification and drawings. For instance, although the base members 6, 40 are formed by stacking two plate members, they may be formed integrally with a synthetic resin. The tape measure 10 may be configured to be stored not only from the downward side, but also from the side surface or the upper side.

The invention claimed is:

1. A circular saw guide device comprising:
a base member including a guide end on one end side in a longitudinal direction for guiding a saw blade along the guide end, the base member to be abutted to a surface of a workpiece; and
a tape measure arranged on the other end side in the longitudinal direction of the base member, the tape measure including a freely movable back and forth, the scale including a locking section to be hooked to an end face of the workpiece,
handle member is arranged over an upper surface of the grip section of the base member, the handle member forming a through section for passing fingers through the handle member,
wherein the guide end can be set at a desired machining position based on scale marks of the scale by moving the base member with the locking claw hooked to the end face of the workpiece, and
wherein the scale marks of the scale start from a value equal to length dimensions from the guide end to a measurement point at which to read the scale marks.

2. The circular saw guide device as claimed in claim 1, wherein a grip section narrow in width in a direction orthogonal to the longitudinal direction is arranged between the one end side and the other end side of the base member, and
wherein a guide member extending in the longitudinal direction along a side surface perpendicular to the surface of the workpiece is arranged on a side of the grip section in the direction orthogonal to the longitudinal direction of the base member.

3. The circular saw guide device as claimed in claim 2, wherein a stepped edge is arranged in parallel to the guide end and inward from the guide end in the longitudinal direction of the base member for guiding a housing of a circular saw along the stepped edge, and
wherein a portion between the guide end and the stepped edge serves as a support surface for placing the housing on the support surface.

4. The circular saw guide device as claimed in claim 3, wherein the support surface has a width exceeding a width in the longitudinal direction of the housing and has dimensions according to a type of saw to be used by cutting off excess dimensions using the saw blade before use.

5. The circular saw guide device of claim 2,
wherein the guide member is arranged also on a side opposite to the grip section in the direction orthogonal to the longitudinal direction of the base member, and
wherein the guide members are arranged retractable so that one of the guide members causes no interference with the other guide member when using the other guide member.

6. The circular saw guide device of claim 1, wherein a tape measure storage section is arranged on the other end side of the handle member, the tape measure storage section for detachably storing the tape measure.

7. The circular saw guide device as claimed in claim 6, wherein dimensions between an end on the one end side of the handle member and the stepped edge of the base member is set so that a motor of the circular saw causes no interference with the handle member.

8. The circular saw guide device as claimed in claim 6, wherein a memo writing section is arranged on the handle member.

9. The circular saw guide device as claimed in 8, wherein the memo writing section is a whiteboard.

* * * * *